United States Patent
Yost et al.

(10) Patent No.: US 6,269,393 B1
(45) Date of Patent: *Jul. 31, 2001

(54) SYSTEM AND METHOD FOR AUTOMATIC TRANSMISSION OF PERSONALIZED OLAP REPORT OUTPUT

(75) Inventors: Kyle N. Yost, Arlington, VA (US); Peter G. Wilding, Denver, CO (US); Robert G. Trenkamp, Washington, DC (US)

(73) Assignee: Microstrategy, Inc., Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/597,689

(22) Filed: Jun. 19, 2000

Related U.S. Application Data

(63) Continuation of application No. 09/343,562, filed on Jun. 30, 1999.
(60) Provisional application No. 60/126,055, filed on Mar. 23, 1999.

(51) Int. Cl.[7] ........................................... G06F 15/16
(52) U.S. Cl. .................... 709/201; 709/219; 709/229
(58) Field of Search ........................... 709/217, 223, 709/201, 218, 229; 705/10, 14, 35, 37; 707/1, 2, 3, 4, 100; 711/147, 151; 345/329, 330, 331

(56) References Cited

U.S. PATENT DOCUMENTS

| | | |
|---|---|---|
| 4,989,141 | 1/1991 | Lyons et al. . |
| 5,189,608 | 2/1993 | Lyons et al. . |
| 5,270,922 | 12/1993 | Higgins . |
| 5,692,181 | 11/1997 | Anand et al. . |
| 5,717,923 | 2/1998 | Dedrick . |
| 5,765,028 | 6/1998 | Gladden . |
| 5,781,735 | 7/1998 | Southard . |
| 5,848,397 | 12/1998 | Marsh et al. . |
| 5,852,819 | 12/1998 | Beller . |
| 5,872,921 | 2/1999 | Zahariev et al. . |
| 5,893,905 | 4/1999 | Main et al. . |
| 5,913,202 | 6/1999 | Motoyama . |
| 5,918,225 | 6/1999 | White et al. . |
| 5,918,232 | 6/1999 | Pouschine et al. . |
| 5,940,818 | 8/1999 | Malloy et al. . |
| 5,946,666 | 8/1999 | Nevo et al. . |
| 5,956,693 | 9/1999 | Greerlings et al. . |
| 5,974,441 | 10/1999 | Rogers et al. . |
| 5,978,766 | 11/1999 | Luciw . |
| 6,012,066 | 1/2000 | Discount et al. . |
| 6,012,083 | 1/2000 | Savitzky et al. . |
| 6,038,561 | 3/2000 | Snyder et al. . |
| 6,078,924 * | 6/2000 | Ainsbury et al. ..................... 707/101 |
| 6,151,601 * | 11/2000 | Papierniak et al. .................... 707/10 |
| 6,154,766 * | 11/2000 | Yost et al. ............................ 709/201 |
| 6,173,310 * | 1/2001 | Yost et al. ............................ 709/201 |

OTHER PUBLICATIONS

Advertisement for Progressive Telecommunications Corporation's OPUS (undated).
KnowledgeX Workgroup Edition Publication (undated).
Relational OLAP Interface, Programmer's Reference and SDK Guide, Version 5.0, Aug. 1998.

(List continued on next page.)

Primary Examiner—Zarni Maung
Assistant Examiner—Jason D. Cardone
(74) Attorney, Agent, or Firm—Hunton & Williams

(57) ABSTRACT

A system for automatic generation of personalized output from an on-line analytical processing system. The system processes at least one scheduled service in an on-line analytical processing system and generates personalized output based on personalization information for subscribers of the service to one or more subscriber output devices. The system enables a user to specify global and service-specific personalization information including specification of multidimensional filters to be applied to services and the specification of trigger criteria to be satisfied before output is generated. Personalization information may also be set for each output device for a particular subscriber.

62 Claims, 4 Drawing Sheets

OTHER PUBLICATIONS

Prospectus—4,000,000 Shares Microstrategy Class A Common Stock, Jun. 11, 1998.
Data Warehouse Dossier, Fall 1998.
Media Output Book, v2.0, Feb. 16, 1999.
Microstrategy Products and Services, 1998.
Relational OLAP Interface for the Web, 1996.
Microstrategy Introduces DSS Broadcaster—The Industry's First Information Broadcast Server, Mar. 23, 1998, http://www.strategy.com/newsandevents/News/PressReleases/1998/broadcaster.htm.
Microstrategy Announces Enhanced Versions of DSS Web and DSS Server, Oct. 26, 1998, http://www.strategy.com/NewsandEvents/news/pressreleases/1998/server5.5htm.
Frequently Asked Questions About DSS Web, printed Feb. 23, 1999, http://www.stratefy.com/products/Web/faq.htm.
Personalized Information Broadcast Server, 1998.
System Guide DSS Web Version 5.5, Feb. 1999.
Developer Guide DSS Web Version 5.5, Feb. 1999.
Lehn, R, et al., Data warehousing tool's architecture: from multidimensional analysis to data mining, pp. 636–643, Database and Expert Systems Applications, 1997.
Zaiane, O.R., et al., Discovering Web access patterns and trends by applying OLAP and Data mining technology on Web logs, pp. 19–29, Research and Technology Advances in Digital Libraries, 1998.
Kurz, A., et al., Data warehousing within intranet: prototype of a web–based executive information system, pp. 627–632, Database and Expert Systems Applications, 1997.
Ewen, Edward F., et al., Data warehousing in an integrated health system: building the business case, pp. 47–563, Conference on Information and Knowledge Management, Nov. 3–7, 1998.
Ho, Ching–Tien et al., "Partial–Sum Queries in OLAP Data Cubes Using Covering Codes," ACM 0–89791–910–6, pp. 228–237.
Gupta, Himanshu et al., "Index Selection for OLAP," IEEE 1063–6382, pp. 208–219.
Avnur, Ron et al., "Control: Continuous Output and Navigation Technology with Refinement On–Line," ACM 0–89791–995–5, pp. 567–569.
Liang, Weifa et al., "Compound Multidimensional Aggregates in Parallel," IEEE 0–8186–8603–0, pp. 92–99.

\* cited by examiner

SYSTEM AND METHOD FOR AUTOMATIC TRANSMISSION OF PERSONALIZED OLAP REPORT OUTPUT

RELATED APPLICATIONS

This application claims priority from U.S. Provisional Application No. 60/126,055, filed Mar. 23, 1999 entitled "System and Method for Automatic Transmission of On-Line Analytical Processing, System Report Output" and is a continuation of U.S. application Ser. No. 09/343,562, filed Jun. 30, 1999. "This application is also related by subject matter to the following U.S. Patent Applications: "System and Method For Subscription Interfacing in an Automatic Broadcast OLAP Report System," Ser. No. 09/345,439; "System and Method for Adaptable Automatic Output of OLAP Reports To Output Devices," Ser. No. 09/345,561; and "System and Method for A management of an Automatic OLAP Report Broadcast System," Ser. No. 04/345,439.

FIELD OF THE INVENTION

This invention relates to a system and method for automatic broadcasting of personalized reports processed by an on-Line analytical processing system reports to subscriber devices, including electronic mail, pagers, personal digital assistants (PDA), facsimiles, printers, telephones, and mobile phones, based on subscriber-specified or administrator-specified criteria.

BACKGROUND OF THE INVENTION

The ability to act quickly and decisively in todays increasingly competitive marketplace is critical to the success of any organization. The volume of data that is available to organizations is rapidly increasing and frequently overwhelming. The availability of large volumes of data presents various challenges. One challenge is to avoid inundating an individual with unnecessary information. Another challenge is to ensure all relevant information is available in a timely manner.

One known approach to addressing these and other challenges is known as data warehousing. Data warehouses, relational databases, and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of record, such as one or more transaction-based database systems. A data warehouse typically allows users to tap into a business's vast store of operational data to track and respond to business trends that facilitate forecasting and planning efforts. A data mart may be considered to be a type of data warehouse that focuses on a particular business segment.

Decision support systems have been developed to efficiently retrieve selected information from data warehouses. One type of decision support system is known as an on-line analytical processing system ("OLAP"). In general, OLAP systems analyze the data from a number of different perspectives and support complex analyses against large input data sets.

There are at least three different types of OLAP architectures—ROLAP, MOLAP, and HOLAP, ROLAP ("Relational On-Line Analytical Processing") systems are systems that use a dynamic server connected to a relational database system. Multidimensional OLAP ("MOLAP") utilizes a proprietary multidimensional database ("MDDB") to provide OLAP analyses. The main premise of this architecture is that data must be stored multidimensionally to be viewed multidimensionally. A HOLAP ("Hybrid On-Line Analytical Processing") system is a hybrid of these two.

ROLAP is a three-tier, client/server architecture comprising a presentation tier, an application logic tier and a relational database tier. The relational database tier stores data and connects to the application logic tier. The application logic tier comprises a ROLAP engine that executes multidimensional reports from multiple end users. The ROLAP engine integrates with a variety of presentation layers, through which users perform OLAP analyses. The presentation layers enable users to provide requests to the ROLAP engine. The premise of ROLAP is that OLAP capabilities are best provided directly against a relational database, e.g., the data warehouse.

In a ROLAP system, data from transaction-processing systems is loaded into a defined data model in the data warehouse. Database routines are run to aggregate the data, if required by the data model. Indices are then created to optimize query access times. End users submit multidimensional analyses to the ROLAP engine, which then dynamically transforms the requests into SQL execution plans. The SQL is submitted to the relational database for processing, the relational query results are cross-tabulated, and a multidimensional result set is returned to the end user. ROLAP is a fully dynamic architecture capable of utilizing pre-calculated results when they are available, or dynamically generating results from atomic information when necessary.

The ROLAP architecture directly accesses data from data warehouses, and therefore supports optimization techniques to meet batch window requirements and to provide fast response times. These optimization techniques typically include application level table partitioning, aggregate inferencing, denormalization support, and multiple fact table joins.

MOLAP is a two-tier, client/server architecture. In this architecture, the MDDB serves as both the database layer and the application logic layer. In the database layer, the MDDB system is responsible for all data storage, access, and retrieval processes. In the application logic layer, the NDDB is responsible for the execution of all OLAP requests. The presentation layer integrates with the application logic layer and provides an interface through which the end users view and request OLAP analyses. The client/server architecture allows multiple users to access the multidimensional database.

Information from a variety of transaction-processing systems is loaded into the MDDB System through a series of batchRoutines. Once this atomic data has been loaded into the MDDB, the general approach is to perform a series of batch calculations to aggregate along the orthogonal dimensions and fill the MDDB array structures. For example, revenue figures for all of the stores in a state would be added together to fill the state level cells in the database. After the array structure in the database has been filled, indices are created and hashing algorithms are used to improve query access times.

Once this compilation process has been completed, the MDDB is ready for use. Users request OLAP reports through the presentation layer, and the application logic layer of the MDDB retrieves the stored data.

The MOLAP architecture is a compilation-intensive architecture. It principally reads the pre-compiled data, and has limited capabilities to dynamically create aggregations or to calculate business metrics that have not been pre-calculated and stored.

The hybrid OLAP ("HOLAP") solution is a mix of MOLAP and relational architectures that support inquiries against summary and transaction data in an integrated fashion. The HOLAP approach enables a user to perform multidimensional analysis on data in the MDDB. However, if the user reaches the bottom of the multidimensional hierarchy and requires more detailed data, the HOLAP engine generates an SQL to retrieve the detailed data from the source relational database management system ("RDBMS") and returns it to the end user. HOLAP implementations rely on simple SQL statements to pull large quantities of data into the mid-tier, multidimensional engine for processing. This constrains the range of inquiry and returns large, unrefined result sets that can overwhelm networks with limited bandwidth.

As described above, each of these types of OLAP systems are typically client-server systems. The OLAP engine resides on the server side and a module is typically provided at a client-side to enable users to input queries and report requests to the OLAP engine. Current client-side modules are typically stand alone software modules that are loaded on client-side computer systems. One drawback of such systems is that a user must learn how to operate the client-side software module in order to initiate queries and generate reports.

Although various user interfaces have been developed to enable users to access the content of data warehouses through server systems, many such systems experience significant drawbacks. All of these systems require that the user connect via a computer system to the server system to initiate reports and view the contents of the reports.

Moreover, current systems require that the user initiate a request for a report each time the user desires to have that report generated. A particular user may desire to run a particular report frequently to determine the status of the report.

Further, reports may be extensive and may contain a large amount of information for a user to sort through each time a report is run. A particular user may only be interested in knowing if a particular value or set of values in the report has changed over a predetermined period of time. Current systems require the user to initiate the new report and then scan through the new report to determine if the information has changed over the time period specified.

These and other drawbacks exist with current OLAP interface systems.

SUMMARY OF THE INVENTION

An object of the invention is to overcome these and other drawbacks in existing systems.

Another object of the present invention is to provide a system that automatically broadcasts personalized messages to subscribers based on criteria established by the subscriber, or a system administrator hen those criteria are determined to be satisfied by an on-line analytical processing system.

Another object of the present invention is to provide personalized information broadcasts of information from an on-line analytical processing system through a variety of user output devices depending on the criteria established by the user.

Another object of the present invention is to provide a system that enables a user to personalize the content of information broadcasts from a data warehouse through a subscription interface system that contains references to the contents of the data warehouse.

These and other objects are realized by a system and method according to the present invention as described below. Such a system and method comprises a broadcast module that connects to an on-line analytical processing (OLAP) system comprising a server system for accessing information in one or more data warehouses to perform report analysis. The broadcast module may enable the defining of a service. A "service" as used herein should be understood to include one or more reports that are scheduled to be run against one or more data warehouses, relational databases, files in a directory, information from a web or file transfer protocol site, or information provided by a custom module, by a server system. These services may be subscribed to by users or user devices to enable the broadcast module to determine who should receive the results of a service.

These and other objects of the present invention are realized through various embodiments described herein. According to one embodiment, a system for automatic generation of personalized output from an on-line analytical processing system is provided. The system processes at least one scheduled service in an on-line analytical processing system and generates personalized output based on personalization information for subscribers of the service to one or more subscriber output devices. The system enables a user to specify global and service-specific personalization information including specification of multidimensional filters to be applied to services and the specification of trigger criteria to be satisfied before output is generated. Personalization information may also be set for each output device for a particular subscriber.

The broadcast module enables the creation of a service, the scheduling of the service, subscription of users to the defined services, generation of reports for the service, formatting of outputs of the service and broadcasting of messages based on the output for the service, among other functions. A subscription interface module may be provided to enable users to select the services they want to subscribe to, the schedule on which they want to receive the contents of the service, and the personalization criteria to use for personalizing their content. A personalization module may be provided that enables subscribers to personalize the content of an individual service to which the subscriber is subscribing or to all services to which the subscriber subscribes. The broadcast module may be connected to a plurality of user devices including a personal digital assistant (PDA), facsimile, printer, pager, mobile phone, telephone, electronic mail, and web page output.

According to one embodiment of the present invention, a system for automatically generating output from an on-line analytical processing system based on scheduled services specified by subscribers of the system is provided. The system processes scheduled services in an on-line analytical processing system with each service comprising at least one query to be performed by the on-line analytical processing system. The system then automatically forwards output from the services to one or more subscriber output devices specified for that service. Users may define new services, including the schedule of the services and the type, such as alert services or scheduled services, and may also subscribe to the services provided by the system. If an alert service is processed, the system may forward output only when one or more alert criteria are satisfied. Subscribers may be specified by a dynamic recipient list that is resolved each time the service is processed to determine recipients of the service output. A dynamic recipient list may be, for example, a list that determines the recipients of a service based on dynamically resolved criteria. For example, a bank may generate a list every month that identifies customers who have an account balance greater than $100,000 and who have not made a transaction within the last three months. The output devices the system may forward output to may comprise electronic mailbox, facsimile, printer, mobile phone, telephone, pager, PDA or web pages.

According to another embodiment of the present invention, a system that enables subscribers to personalize services used for automatically generating output from an on-line analytical processing system is provided. In addition to enabling subscribers to specify the content and schedule of one or more services, the system enables subscribers to personalize various other parameters relating to the service. For example, subscribers may specify the format of service output, filters to be applied to the service, and a variety of other personalization options described in greater detail below.

According to another embodiment of the invention, the system utilizes static recipient lists ("SRL") and dynamic recipient lists ("DRL") for determining subscribers to a service. SRLs may be a list of manually entered subscriber names of a particular service. DRLs, however, may be a report generated by the system listing subscriber names that meet a predetermined criteria for a service. DRLs enable lists of subscribers to change according to certain criteria applied to contents of a database. For example, a DRL may be used to broadcast a sales report to only those subscribers who are managers of stores who have not met a predetermined sales goal.

Other objects and advantages of the present invention will be apparent to one of ordinary skill in the art upon reviewing the detailed description of the present invention.

DETAILED DESCRIPTION OF THE PREFERRED EMBODIMENTS

Figure 1:
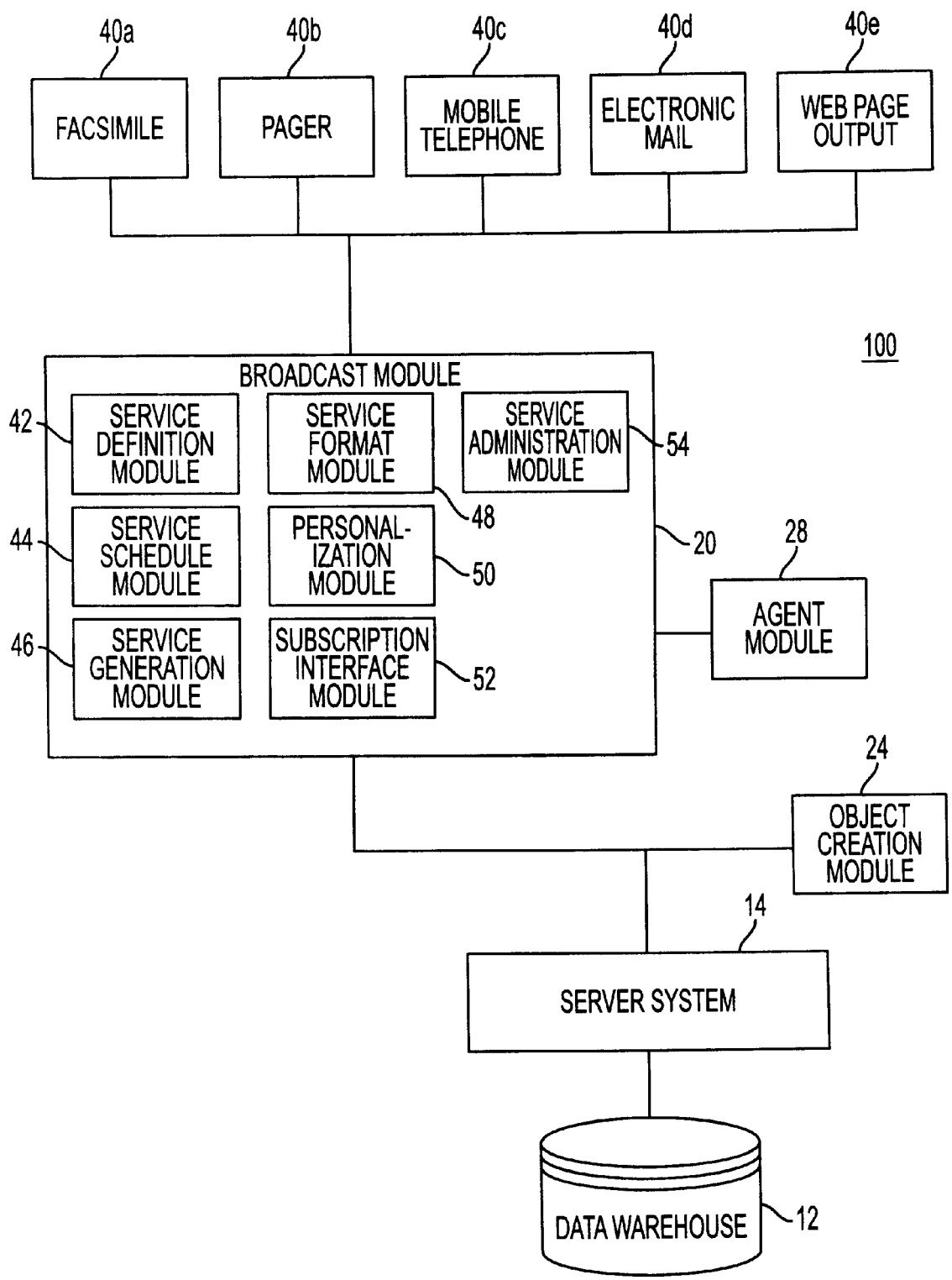
FIG. 1 is a schematic block diagram of a system in accordance with an embodiment of the present invention.
Figure 2:
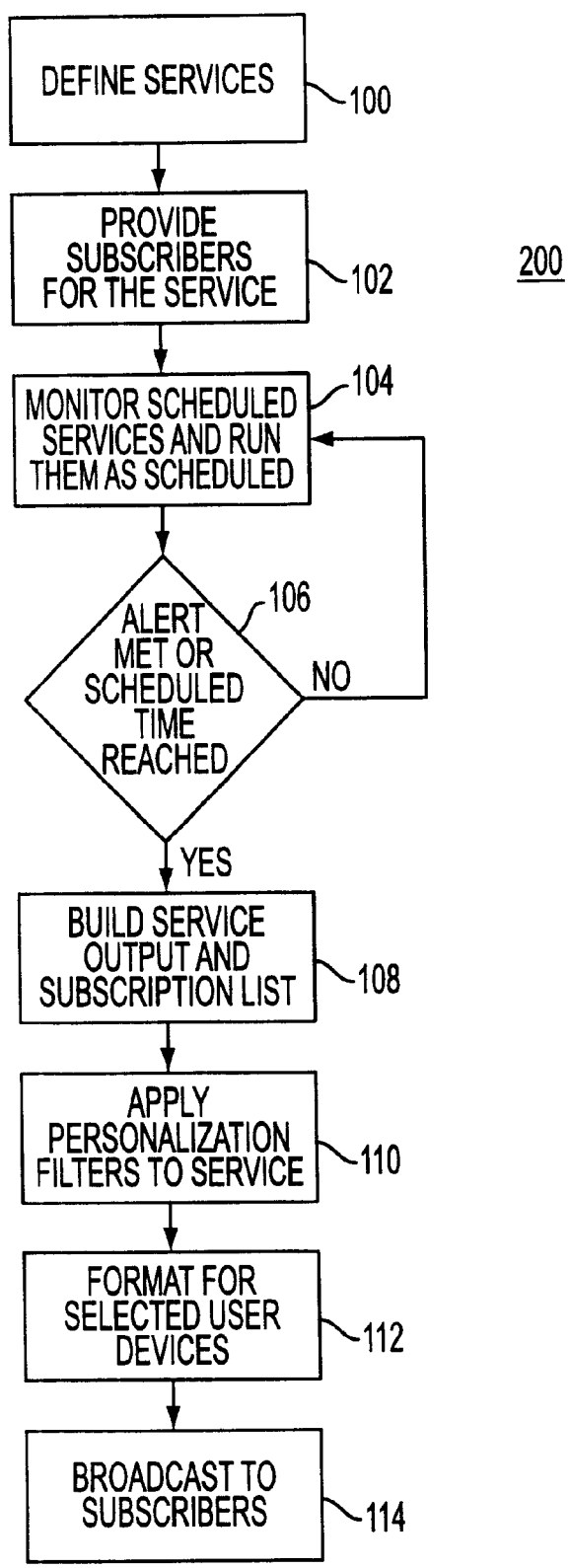
FIG. 2 is a schematic block diagram of a method for automatic transmission of OLAP report information.

According to one embodiment of the present invention, a system is provided for automatic transmission of OLAP report output to one or more of a plurality of user output devices. FIG. 1 depicts an embodiment of a system 100 according to the present invention. System 100 may comprise a data warehouse 12, a server system 14, a broadcast module 20, an object creation module 94, an agent module 28, and one or more user devices 40. User devices 40 may comprise a facsimile 40a, pager 40b, mobile telephone 40c, electronic mail 40d, and web page output 40e.

Broadcast module 20 may comprise a module that broadcasts personalized information derived from the OLAP system (e.g., data warehouse 12 and sever system 14) to users via one or more user devices 40 such as electronic mail, facsimile, printer, pager, mobile phone, telephone, PDA, and multiple other types of user information devices. Broadcast module 20 enables users to define services (e.g. queries and reports) that are to be run against an OLAP system such as server system 14 and data warehouse 12 based on a predetermined schedule. A "service" as used herein should be understood to include one or more reports that are scheduled to be run against data warehouse 12 by server system 14. Broadcast module 20 also enables users on the system to subscribe to one or more services and then broadcast module 20 outputs the results of these services to subscribers according to criteria established by the subscribers.

Data warehouse 12 may comprise any data warehouse or data mart as is known in the art, including a relational database management system ("RDBMS"), a multidimensional database management system ("MDDBMS") or a hybrid system. Server system 14 may comprise an OLAP server system for accessing and managing data stored in data warehouse 12. Server system 14 may comprise a ROLAP engine, MOLAP engine or a HOLAP engine according to different embodiments. Specifically, server system 14 may comprise a multithreaded server for performing analysis directly against data warehouse 12. One embodiment of server system 14 may comprise a ROLAP engine known as DSS Server™ offered by MicroStrategy. Accordingly, data warehouse 12 and server system 14 comprise an OLAP system that connects to broadcast module 20 for broadcast of user-specified reports from data maintained by data warehouse 12.

Broadcast module 20 may also be connected to an agent module 28 which may also be connected to server system 14. Agent module 28 may be provided to define reports and queries that may be selected as part of one or more services by broadcast module 20. Agent module 28 may be used to define queries to be performed against the data contained in data warehouse 12 using components, templates, filters, reports, agents, etc. Components may include dimensions, attributes, attribute elements, and metrics—in other words, the building blocks for templates, filters, and reports. Templates generally define a report format and specify the attributes, dimensions, metrics, and display properties comprising a report. Filters generally qualify report content and identify a subset of data warehouse 12 to be included in a report. Filters may also be used to apply set math to report content. For example, filters may be used with set math, multidimensional qualifications, and metric qualifications. Using set math, users can define and embed any set of limiting criteria (e.g., union, intersect, exclude). Multidimensional qualifications enable users to indicate general subject areas or perspectives on data (e.g., time, geography, product). Metric qualifications may be used to compute mathematical calculations of various numerical data (e.g., total sales, profit, cost, percent change, profit). Metrics may be displayed in a variety of formats (e.g., percentages, currency, fonts indicating predetermined values). Reports are generally understood to be a data analysis created by combining a template (the format) with a filter (the content). Agents may be a group of reports cached on a time- or event-based schedule for rapid retrieval and batch processing. According to one embodiment of the invention, agent module 28 may comprise a software package known as DSS AgentT™ offered by MicroStrategy.

Agent module 28 may operate on any user system 26 including personal computers, network workstations, laptop computers or any other electronic device connected to server system 14 or may comprise an object connected to broadcast module 20.

Broadcast module 20 therefore, cooperates with server system 14 and agent module 28 to send personalized information to users at predefined intervals or when criteria specified in reports defined through either broadcast module 20 or agent module 28 exceed predefined thresholds. To provide this functionality, broadcast module 20 enables users of the system to create services that run against the OLAP system to generate information and subscriptions that specify the recipients of the information derived from a service. A service may comprise one or more reports that are processed by the OLAP system and may be a specificreport, series of reports or elements within a report. Also, subscribers may include users, groups of users or only specific user devices 40 for a particular user. Services may be based on predefined reports from broadcast module 20 or agent module 28 or may be based on filter/template combinations set up through broadcast module 20 and/or agent module 28.

Once services have been defined and subscribers to that services are established broadcast module 20 continually monitors the schedules for the services, runs the scheduled reports, and automatically generates outputs where conditions specified in the service are satisfied using push technology. Outputs from broadcast module 20 may be personalized to subscriber demands and/or formatted to meet a subscriber's user device requirements to ensure that users see only that portion of a report that is relative to that user and in a manner that is most useful for the user. Accordingly, a user can thus have up-to-date information about the contents of data warehouse 12 without having to submit a query or log-in to a software module on the user system.

To provide the functionality described above, broadcast module 20 may comprise a plurality of modules that perform certain functions. Although described as separate modules, it should be understood that such modules may be combined or separated further. In an embodiment of the present invention, as depicted in FIG. 1, broadcast module 20 may comprise a service definition module 42, a service schedule module 44, a service generation module 46, a service format module 48, a personalization module 50, a subscription interface module 52, and a service administration module 54.

Service definition module 42 of broadcast module 20 may comprise a module for enabling a user to create or modify a service. In an embodiment, the services may be defined based on reports or workbooks specified in agent module 28. Users may then subscribe to services defined in service definition module to enable broadcast module 20 to determine who should receive the results of a service.

At least two types of services may be provided— scheduled services and alert services. A schedule service may comprise a service that generates information to subscribers at a given time interval. An alert service may comprise a service that provides information to all subscribers if an alert condition is true.

Service schedule module 44 may provide the functionality to enable selection of when a service should be run. Service schedule module 44 may enable a user, administrator or other person having access thereto to specify the frequency that the service should be performed. The schedule may be based on an interval (such as every several hours, days, weeks, months, years, etc.) or on one or more specified days (such as March 15th and September 15th). Other methods of scheduling events to be processed may also be used.

Service generation module 46 may comprise a module for following a schedule set by service schedule module 44 and completing the operation specified in service definition module 42. For example, if a service were specified to run the monthly sales totals for the Midwest region of a company every weekend and generate an alert to the supervisor on Monday morning if sales drop below 5%, then service generation module 46 would be responsible to monitor the schedule of this service to ensure that the report contained therein was processed over the weekend and then generate an alert report if the criteria set in the service is satisfied. To monitor the schedule of all services specified by broadcast module 20, service generation module 46 may operate constantly to ensure that every scheduled service is completed.

Service format module 48 may be responsible for taking the results of a service and formatting it to a proper format corresponding to each of the subscribers of a particular service. Service format module 48 may be responsible for formatting service results for generation to user devices 40a–40e.

Personalization module 50 may be provided to enable subscribers to specify the content for a service in which they are interested. Users may input personalized choices for personalization module 50 through subscription interface module 52 by selecting personalization filters from filters available in the service. Personalization module 50 captures the criteria selected by the user and creates a subscription based on the selected criteria which may be multidimensional based on the data structure in the data warehouse, relational database, etc. Because personalization module 50 enables subscribers to specify the content of a service, this reduces the amount of data output to a subscriber by providing the subscriber Keith data that the subscriber is interested in.

Personalization may be set on a global level that is applied to all services to which the subscriber subscribes and on a service level basis that apply only to specific services. For global level personalization, a profile may be created on the system in an address book module maintained by broadcast module 20. The address book may comprise an entry for each subscriber of any service on the system. That subscriber may define global personalization filters to be applied to all services to which the subscriber applies rather than providing personalization on only a service by service basis. Each subscriber may have multiple addresses in the address book, each address assigned to a different output device. Thereby, a subscriber may have multiple addresses for different output devices and for each address, different filters may be applied to a service level request or to global subscriptions by that user for that address. For example, a user may desire to get stock information via pager but sales information via e-mail. By setting up two separate addresses—one for the pager and another for the e-mail— and selecting a service for that address, the may be able to customize content to different output devices according to the present invention. A user may also set-up a pager alert. The pager alert may contain a summary of information requested by the user that is communicated to the user's pager. The pager alert may also direct the user to another information source (e.g., an e-mail message or web page) that contains more detailed information.

For a chosen user, personalization may also be set on a project level basis. For example, a project may comprise multiple reports. Each report within a project may have different personalized filters applied according to user desires. Personalization module 50, however, also enables subscribers to personalize the entire rather than doing so for each. For example, subscribers may assign particular operations to be performed for each of the reports within a project.

This enables subscribers to personalize multiple reports simultaneously.

Additionally, subscribers may personalize style parameters using, for example, personalization module 50. Styles may be used to tailor a display format of a report to a particular device (e.g., pager, electronic mail, facsimile). Styles may be designed according to the needs of each subscriber depending on the characteristics and properties of a recipient. For example, a user may desire to have pages generated from the report sent in a particular format and may set up that format using styles.

With both global personalization filters set for a particular user or user device and service-level filters selected, the system may apply an order of priority to these filters. In an embodiment of the present invention, service-level filters override and take priority over global personalization filters. All filters may be merged and only the conflicting filters may be resolved in favor of the service-level filters.

Subscription interface module 52 may be provided to enable users or administrators of the system to monitor and update subscriptions to various services provided by broadcast module 20. Service administration module 54 may be provided to provide administrative functions to monitor a queue to schedule services and to provide throughput of services to ensure efficient completion of those services by broadcast module 20.

Subscription interface module 52 may be used to create a subscriber list by adding one or more subscribers to a service. Users or system administrators having access to broadcast module 20 may add multiple types of subscribers to a service such as a subscriber from either a static recipient list (SRL) (e.g., addresses and groups) or a dynamic recipient list (DRL) (described in further detail below). The subscribers may be identified, for example, individually, in groups, or as dynamic subscribers in a DRL. Subscription interface module 52 permits a user to specify particular criteria (e.g., filters, metrics, etc.) by accessing data warehouse 12 and providing the user with a list of available filters, metrics, etc. The user may then select the criteria desired to be used for the service.

A SRL is a list of manually entered names of subscribers of a particular service. The list may be entered using service administration module 54 or subscription interface module 52. SRL entries may be personalized such that for any service, a personalization filter (other than a default filter) may be specified. A SRL enables different personalizations to apply for a login alias as well. For example, a login alias may be created using personalization module 50. Personalization module 50 enables subscribers to set preferred formats, arrangements, etc. for displaying service content. The login alias may be used to determine a subscriber's preferences and generate service content according to the subscriber's preferences when generating service content for a particular subscriber.

A DRL may be a report which returns lists of valid user names based on predetermined criteria that are applied to the contents of a database such as data warehouse 12. Providing a DRL as a report enables the DRL to incorporate any filtering criteria desired, thereby allowing a list of subscribers to be derived by an application of a filter to the data in data warehouse 12. In this manner, subscribers of a service may be altered simply by changing the filter criteria so that different user names are returned for the DRL. Similarly, subscription lists may be changed by manipulating the filter without requiring interaction with service administration module 54. Additionally, categorization of each subscriber may be performed in numerous ways. For example, subscribers may be grouped via agent filters. In one specific embodiment, a DRL is created using DSS Agent™ offered by MicroStrategy.

Service administration module 54 enables monitoring of reports (e.g., ability to see who is using system, what reports they are generating, etc.), scheduling of reports, address book and dynamic recipient list maintenance, and subscriber management. Subscriber management involves enabling system administrators to review, access, and generate information about subscribers to the system through the maintenance of detailed subscriber lists including the DRL's and SRL's. This list may track information on which subscribers subscribe to which services and vise-versa.

Figure 3:
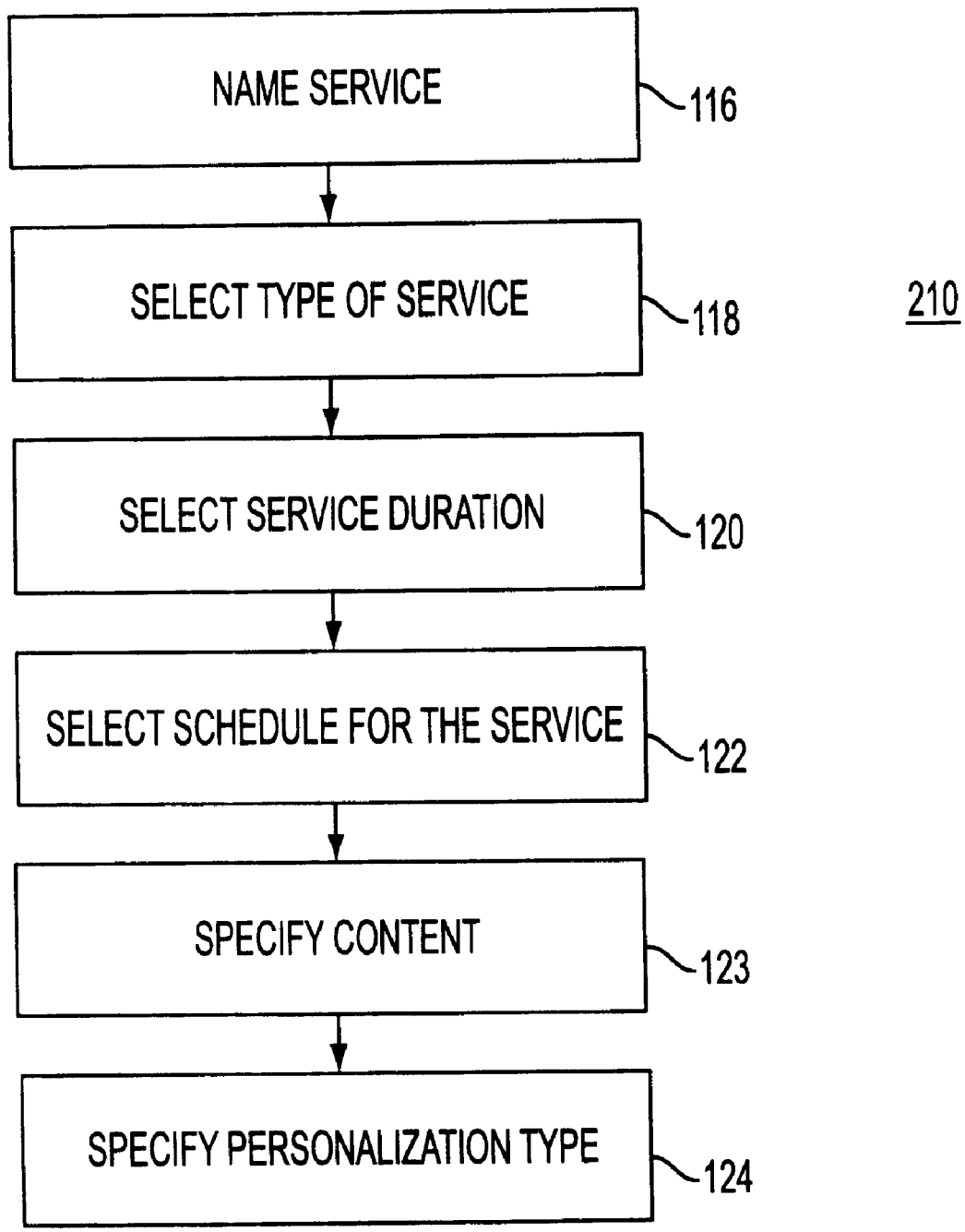
FIG. 3 is a schematic block diagram of a method for creating a service according to an embodiment of the present invention.

A method 200 of operation of system 100 is provided in FIG. 3. Method 200 comprises several steps for generating information to a plurality of user systems using "push" technology. In step 100, one or more services are defined by users or system administrators for broadcast module 20 to monitor, as described in more detail below with respect to FIG. 4, such as through service definition module 42. In step 102, subscribers for each of these various services are provided such as through subscription interface module 52. In step 104, the system monitors and processes services according to their defined schedules. Step 104 may be performed by service schedule module 44, and/or service generation module 46, for example.

In step 106, the system determines whether an alert criteria has been met or if a scheduled service has been completed, such as through service generation module 46. If an alert criteria has not been satisfied or a scheduled service has not completed, the system continues to monitor and process services. If an alert condition has been met, or if a scheduled service has been completed, in step 108, the system, such as through service generation module 46, builds the service output and the subscription list for that particular service. Building the subscription list for a service may involve using a recipient list resolution method. For example, a recipient list resolution (RLR) may be used to build a list of all of the subscribers to a service in step 108. This may be performed by resolving and merging all DRLs with all SRLs for a given service. All DRLs are generated and the resulting list is merged with the SRL. Typically, there is only one SRL (although additional SRLs may be used) and none to numerous DRLs per service. The list that results from merging all of the DRLs and SRLs produces a list which consolidates all subscribers of a given service.

Next, in step 110, the system, such as through personalization module 50, applies personalization filters to services that are scheduled to be output to the subscribers. Personalization filters may modify the output of a service according to the subscriber's desired criteria. The personalized outputs may then be formatted for the user device 40 selected by the user for output. Additionally, personalization module 50 may also be used to personalize the contents of one or more services as described above. In step 114, broadcast module 20 broadcasts the formatted and personalized services to subscribers at user devices 40a–40e.

Figure 4:
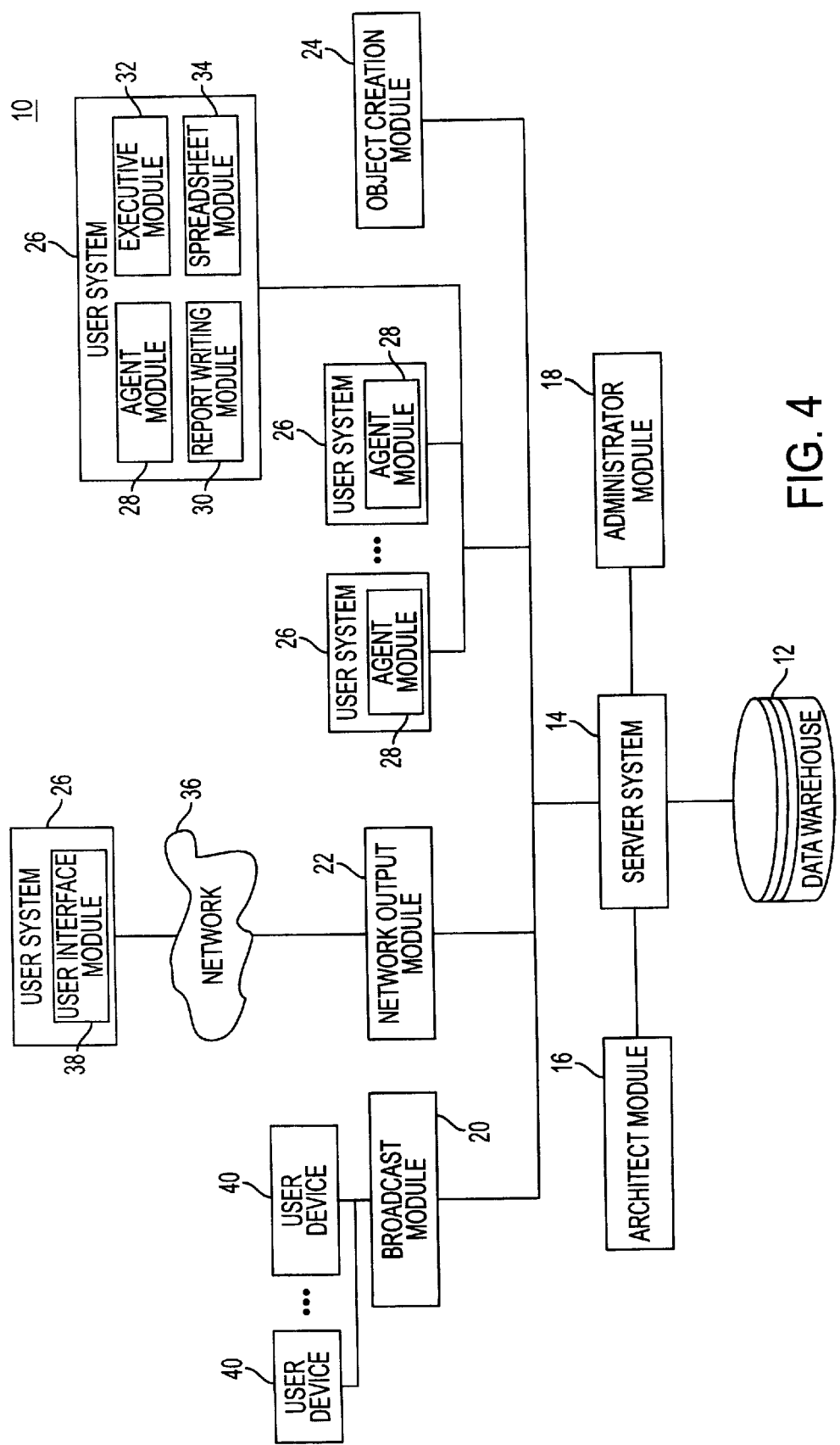
FIG. 4 is a schematic block diagram of an overall system in accordance with an embodiment of the present invention.

As described above, step 100 defines the service or services to be monitored by broadcast module 20. FIG. 4 depicts a method 210 according to one embodiment of the present invention for performing step 100. According to one embodiment, in step 116, a user may name and provide a description of the service or services to be monitored. By providing a name and description, users may be able to uniquely identify the services from an object browser or in a service queue.

Next in step 118, the user selects the type for the service. As described above, at least two types of services may be provided. A first type, a scheduled service, is a service that is run according to a predetermined schedule and output is generated each time the service is run. An alert service is one that is run periodically as well, however, output is only generated when certain alert criteria is satisfied. If an alert service is selected by the user the user may then specify a report or a template/filter combination upon which the alert is based. According to one embodiment, reports and template/filter combinations may be predefined by other objects in the system including agent module 28 or object creation module 24. For example, agent module 28 such as the DSS agent™ offered by MicroStrategy, may be used to create and define reports with filters and template combinations, and to establish the alert criteria that are to be used for an alert service.

Next, in step 120, the duration of the service is input by the user. Service duration indicates the starting and stopping dates for the service. The start date is the base line for the scheduled calculation, while the end date indicates when the broadcast will cease to be sent. The user has the option of starting the service immediately or waiting until some time in the future. Various calendaring features may be provided to enable the user to easily select these start and stop dates. For example, a calendar that specifies a date with pull-down menus that allow the users to select a month and year may be provided according to known methods of selecting dates in such programs as electronic calendaring programs and scheduling programs used in other software products. One specific aid that may be provided is to provide a calendar with a red circle indicating the present date and a blue ellipse around the current numerical date in each subsequent month to more easily allow the user to identify monthly intervals. Other methods may also be used.

Next, in step 122, the user selects the schedule for the service. According to one embodiment, predefined schedules for services may be provided or the user may choose to customize the schedule for the service. If the user desires to create a new schedule, a module may be opened to enable the user to name the schedule and to set the parameters for the schedule. Schedules may be run on a several-minute, hourly, daily, monthly, semi-annual or annual basis, all depending upon what frequency is desired.

The next step, step 123, may be performed to enable the user to specify the content of a service. The content of a service is the various information reports and template/filter combinations that the server system 14 processes using the data in data warehouse 12 in order to provide the output requested for that particular service. The content of a service may comprise many different items or combination of items to suit the user's needs. For example, the user may be able to include a text grid, an agent alert, a web uniform resource location (URL), a spreadsheet container, a new sheet container, a text container, a text message, contents from a text file, or a file attachment. According to one embodiment, the system may organize these various contents into containers. A broadcast container may comprise the highest level container under which all content pieces reside. A grid may comprise an element that is associated with a report or a template/filter combination. The grid may be bound via a macro to a report/filter and template combination. An agent alert may be associated with a particular report that is therefore incorporated within the service. Any report available on agent module 28 may be selected. The web URL item may be associated with the report through network output module 22 that specified that URL for the particular report. A spreadsheet container may be the parent of an embedded spreadsheet attachment. When created, a particular spreadsheet may be included as a child. Additionally, markup language (e.g., XML and/or HTML) documents may also be included.

After the user has named the service, selected the tape, duration, and schedule for the service, the user may select the personalization type in step 124. For example, the user may select an option to either prevent personalization, require personalization, or allow personalize optionally. Upon completion of these steps, the service may be stored by service definition module 42 in a database structure to enable users to retrieve predefined services to subscribe to these services through subscription interface module 52.

Method 210 may also comprise an error condition step. An error condition step may be used to enable users to specify "error" conditions and actions. For example, an "error" condition may be a user notification that a server is "down" or that there is no data to be returned. A user may specify particular actions to be performed by the system in response to one or more error conditions. For example, a user may specify a "server" error (e.g., not responding) and indicate a particular action to be performed in response to a "server not responding" error (e.g.; reattempt in a predetermined time). Various other conditions and actions may be specified.

The system described may also comprise a portion of a larger decision support system 10 as depicted in FIG. 4. System 10 may comprise a data warehouse 12, a server system 14, an architect module 16, an administrator module 18, a broadcast module 20, a network output module 22, a plurality of user systems 26, and an object creation module 24. User systems 26 may comprise an agent module 28 as described above.

Agent module 28 may enable a user access to the contents of data warehouse 12 to provide detailed analysis on an ad hoc basis. One of the advantages of DSS Agent™ includes its use of a ROLAP architecture on server system 14 and a RDBMS in data warehouse 12 to provide a more scaleable environment. Through DSS Agent™, a user can "drill down." Drilling down allows the user to dynamically change the level of detail in a report to a lower level attribute so that the resulting report displays data with a greater level of detail. For example, one can drill down from year to month to week to day. DSS Agent™ also enables users to "drill up" to a higher level attribute. Drilling up summarizes the selected data to a higher level total. For example, one can drill from day to week to month to year. DSS Agent™ also enables a user to "drill within." Drilling within allows a user to go to a different hierarchy within the same dimension. Drilling within is often used to examine the characteristics of selected data. For example, drilling within enables a user to drill from item to color when looking at a particular retail item such as an automobile, clothing or the like. Drilling across allows the user to drill to an altogether different dimension. For example, one can drill across from a region to a month. Accordingly, through use of agent module 28, server system 14, and data warehouse 12, drilling is a powerful tool that is easily implemented using a ROLAP architecture which is not as easily accessible in MOLAP.

Architect module 16 may comprise a module that enables developers to create and maintain data and metadata in data warehouse 12. Metadata may be considered to be data about data, such as data element descriptions, data type descriptions, attributes/property descriptions, range/domain descriptions, and process/method descriptions. Data and metadata stored in data warehouse 12 may thus be modified and organized by architect module 16. According to one embodiment of the invention, architect module 16 may comprise a software package known as DSS Architect™ offered by MicroStrategy.

Administrator module 18 may comprise a module for facilitating the development, deployment, and management of data warehouse applications supporting large volumes of users over various distribution mechanisms. Administrator module 18 may comprise an object manager and a warehouse monitor. The object manager allows objects to be shared across databases for easy migration from development to production. The warehouse monitor provides performance monitoring and management tools to support thousands of users across a distributive database environment. The warehouse monitor collects statistics for the purpose of identifying performance bottlenecks, warehouse tuning, cost analysis and various other purposes. According to one embodiment of the invention, administrator module 18 may comprise a module known as DSS Administrator™ offered by MicroStrategy.

Server system 14 may also connect to an object creation module 24. Object creation module 24 may comprise an open object linking and embedding ("OLE") application program interface ("API") for custom decision support development. According to one embodiment of the invention, object creation module 24 may comprise a software module known as DSS Objects™ offered by MicroStrategy. Additionally, custom applications may interface with object creation module 24 including Delphi, Visual Basic, and C++ programming modules.

User systems 26 may also include a report writing module 30, an executive module 32, and a spreadsheet module 34. Report writing module 26 may comprise an OLAP report writer. Executive module 32 may comprise a module design tool for developing custom EIS applications. This module is a design tool for developing briefing books that provide high level users with a series of views that describe their business. Once created, end users can access briefing books through agent module 28 in EIS mode. Such a system is easily implemented with agent module 28 by compiling sets of analyses into dynamic pages that immediately focus users on their key business drivers. One embodiment of executive module 32 may comprise software known as DSS Executive™ offered by MicroStrategy.

Spreadsheet module 34 may comprise an add-on to existing spreadsheet programs or may comprise an entirely new spreadsheet program. Spreadsheet module 34 may enable reports and analyses generated from agent module 28 to be presented in a traditional spreadsheet program format to enable users to view results in preexisting front-end interfaces. Spreadsheet module 34 may comprise the Microsoft Excel™ spreadsheet program offered by Microsoft and/or an Excel™ Add-In program offered by MicroStrategy.

Another module for accessing content of server system 14 may comprise a network output module 22. Network output module 22 enables user system 26 access to server system 14 and data warehouse 12 without requiring an additional agent module 28 to be stored on user system 26. Instead, user system 26 may have a user interface module 38 residing thereon. User interface module 38 may comprise any module that enables a user system, such as user system 26, to interface with network output module 22 over a network 36. According to one embodiment of the invention, network 36 may comprise an intranet, the Internet or other developed Internet-type networks. Further, user interface module 38 may comprise any standard browser module such as Microsoft Internet Explorer™, Netscape Navigator™ or other. As many user systems 26 already have a user interface module 38 stored and operating thereon, network output module 22 offers the advantage of enabling users access to server system 14 and data warehouse 12 without learning to operate a new module such as agent module 28. One embodiment of network output module 22 may comprise a web-based module called DSS Web™ offered by MicroStrategy. Accordingly, in one embodiment, a user can access server system 14 through a standard web browser, such as Microsoft Internet Explorer™, or over the Internet through network output module 22, such as DSS Web™.

In this embodiment, network output module 22 may comprise a World Wide Web tool used in conjunction with server system 14 for allowing users to deploy data warehouse/decision support applications over the Internet using industry standard World Wide Web browsers as a client. As a result, a user can access the data warehouse with little or no client maintenance, little or no software to install, and only a small amount of additional training while still maintaining all of the capabilities of agent module 28. One embodiment of network output module 22 comprises DSS Web™ offered by MicroStrategy. This embodiment provides a broad array of options for viewing information sets, such as spreadsheet grids and a wide variety of graphs. Through this module's reporting capabilities, users receive key elements of a report in easily interpretable, plain language messages. This module also allows users to "drill" dynamically to a lower level of detail to view the underlying information or to create and save new analyses. For sensitive information, this module provides security plug-ins that allow the user to extend the standard security functionality with additional user authentication routines. This module may also provide an API that allows users to customize, integrate, and imbed this functionality into other applications. For example, a data syndicator for health care information may utilize this module with a customized interface to sell access to health care information to Health Maintenance Organizations, hospitals, pharmacies, etc.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. In a system for automatic generation of personalized output from an on-line analytical processing system, a server system comprising:

service subscription means for enabling a plurality of subscribers to subscribe to a service to be processed on an on-line analytical processing system and to specify one or more personalized reports to be received by specifying personalization parameters to be applied to the base service output;

service processing means for processing at least one scheduled service in an on-line analytical processing system, generating a separate personalized output report for each subscriber to the service based on subscriber-specific personalization information stored for that subscriber from the base service output generated from the on-line analytical processing system; and output forwarding means for automatically forwarding personalized output from the services to one or more subscriber output devices specified for that service.

2. The server system of claim 1 further comprising output formatting means for formatting the service output according to styles specified for each upper output device specified to receive that service output.

3. The server system of claim 2 wherein the styles specify values for a plurality of predefined parameters regarding the format for the service output for use by that user output device.

4. The server system of claim 3 wherein the parameters comprise enclosure handling parameters and text grid parameters.

5. The server system of claim 2 wherein the output formatting means further comprises segmenting means for segmenting the service output into multiple service outputs to be sent to one or more user output devices based on the style specified for that user output device.

6. The server system of claim 2 wherein at least one of the user output devices comprises an HTML mail system and the output formatting means formats the service output for delivery to the HTML mail system.

7. The server system of claim 2 wherein at least one of the user output devices comprises an audio system and the output formatting means formats the service output to deliver an audio version of the service output.

8. The server system of claim 2 wherein the output formatting means formats the service output into a natural language output format.

9. The server system of claim 2 wherein at least one of the user output devices comprises a particular type of pager and wherein the output formatting means formats the service output into a pager message using the style for the particular type of pager specified.

10. The server system of claim 1 further comprising service definition means for receiving definitions of one or more services.

11. The server system of claim 10 wherein the server definition means comprises service scheduling means for enabling a user to specify the schedule for when a service is to be processed.

12. The server system of claim 11 wherein the service processing means processes services according to the schedule specified in the server definition means for the services.

13. The server system of claim 10 wherein the service may comprise an alert service and wherein the output forwarding means automatically forwards output from an alert service only when one or more alert criteria are satisfied.

14. The server system of claim 10 wherein the service may comprise a scheduled service and wherein the output forwarding means automatically forwards output from a scheduled service each time the schedule service is processed.

15. The server system of claim 1 wherein the server system stores one or more services for processing by the service subscription means.

16. The server system of claim 15 wherein the service subscription means enables specifying subscribers to a service by a dynamic recipient list and further comprising dynamic recipient list resolution means for resolving the subscribers in the dynamic recipient list and providing that list of subscribers to the output forwarding means.

17. The system of claim 15, further comprising service modifying means for enabling users to modify the one or more services.

18. The system of claim 1 further comprising processing management means for managing the operation of the service processing means.

19. The server system of claim 18 wherein the processing management means maintains dynamic recipient lists and wherein the service processing means and processing management means resole dynamic recipient lists to generate a list of subscriber output devices to receive the output.

20. The server system of claim 18 wherein the processing management means monitors performance of the service processing means and the output forwarding means to increase throughput and processing speed by reducing duplicate reports.

21. The system of claim 18 wherein the processing management means enables a system administrator to view any service record and any subscriber record.

22. The system of claim 18 wherein the processing management means maintains an address book containing entries for subscribers of the service and enables a system user to view the contents of the address book.

23. The system of claim 18 wherein the processing management means comprises a service module that schedules services for processing by the service processing means.

24. The system of claim 18 wherein the processing management means comprises a governing module that governs the volume of services being processed by the service processing means.

25. The system of claim 18 wherein the processing management means comprises a governing module that governs the number of subscribers to a particular service.

26. The system of claim 18 wherein the processing management means comprises a governing module that governs the number of output devices to which a service may be broadcast.

27. The server system of claim 1, further comprising personalization input means for enabling a subscriber to a service to specify personalized information to be applied to the output of the service for that particular subscriber.

28. The service system of claim 27, where in the service processing means applies the subscriber-specific personalization information specified for each subscriber of the service to the service output for that particular subscriber.

29. The server system of claim 1, further comprising personalization input means for enabling a subscriber to any service of the system to specify personalized information to be applied to output of all services for that particular subscriber.

30. The service system of claims 29, wherein the service processing means applies the personalization information specified for each subscriber of the service to the service output for that particular subscriber.

31. The server system of claim 1, wherein the OLAP system is a relational OLAP system.

32. The server system of claim 1, wherein subscribers may specify personalization information for multiple user output devices of that particular subscriber and wherein the service processing system applies the personalization information for each user output device for the subscriber to generate a service output for each user output device for that subscriber.

33. The server system of claim 1, wherein the personalization information comprises multidimensional filters.

34. The server system of claim 1, wherein the personalization information comprises trigger criteria that cause the output forwarding means to generate output to the subscriber.

35. A method of automatically generating output from an on-line analytical processing system to one or more user devices comprising the steps of:

enabling a plurality of subscribers to subscribe to a service to be processed on an on-line analytical processing system and to specify one or more personalized reports to be received by specifying personalization parameters to be applied to the base service output;

processing at least one scheduled service in an on-line analytical processing system and generating a separate personalized output report for each subscriber to the service based on subscriber-specific personalization information stored for that subscriber from the base service output generated from the on-line analytical processing system; and automatically forwarding personalized output from the services to one or more subscriber output devices specified for that service.

36. The method of claim 35 further comprising the step of formatting the service output according to styles specified for each user output device specified to receive that service output.

37. The method of claim 36 wherein the styles specify values for a plurality of predefined parameters regarding the format for the service output for use by that user output device.

38. The method of claim 37 wherein the parameters comprise enclosure handling parameters and text grid parameters.

39. The method of claim 36 further comprising the step of segmenting the service output into multiple service outputs to be sent to one or more user output device based on the style specified for that user output device.

40. The method of claim 36 wherein at least one of the user output devices comprises an audio system and further comprising the step of formatting the service output to deliver an audio version of the service output.

41. The method of claim 36 further comprising the step of formatting the service output into a natural language output format.

42. The method of claim 35 further comprising the step of receiving definitions for one or more services.

43. The method of claim 42 further comprising the step of receiving a schedule for when a service is to be processed.

44. The method of claim 43 wherein the processing step processes services according to the schedule set for a service.

45. The method of claim 35 further comprising the step of enabling administrator control over the processing and automatically forwarding steps.

46. The method of claim 45 further comprising the steps of maintaining dynamic recipient lists and resolving the dynamic recipient lists to generate a list of subscriber output devices to receive the output.

47. The method of claim 22 further comprising the steps of monitoring performance of the output of services to increase throughput and processing speed by reducing duplicate reports.

48. The method of claim 35, further comprising the step of enabling a subscriber to a service to specify personalized information to be applied to the output of the service for that particular subscriber.

49. The method of claim 35, further comprising the step of applying the subscriber-specific personalization information specified for each subscriber of the service to the service output for that particular subscriber.

50. The method of claim 35 further comprising the step of receiving a list of subscribers to receive output from a service.

51. The method of claim 50 wherein the step of receiving subscribers comprises the step of receiving a dynamic recipient list for a service and further comprising the step of resolving the dynamic recipient list to determine the subscribers for a service.

52. The method of claim 35, wherein the OLAP system is a relational OLAP system.

53. The method of claim 48, further comprising the steps of enabling a subscriber to any service of the system to specify personalized information to be applied to output of all services for that particular subscriber; and applying the personalization information specified for each subscriber to the service output for that particular subscriber.

54. The method of claim 35, wherein subscribers may specify personalization information for multiple user output devices of that particular subscriber and further comprising the step of applying the personalization information corresponding to each user output device for the subscriber to generate a service output for each user output device for that subscriber.

55. The method of claim 35, wherein the personalization information comprises multidimensional filters.

56. The method of claim 35, wherein the personalization information comprises trigger criteria that are satisfied before output is forwarded to the subscriber that specified the personalized trigger criteria.

57. The method of claim 35 wherein the service may comprise an alert service and wherein the forwarding step involves forwarding output from an alert service only when one or more alert criteria are satisfied.

58. The method of claim 35 wherein the service may comprise a scheduled service and wherein the forwarding step involves forwarding output from a scheduled service each time the schedule service is processed.

59. The method of claim 35, further comprising the step of enabling users to modify one or more services.

60. The method of claim 45 wherein the enabling step further comprises enabling administrators to view any service record and any subscriber record.

61. The method of claim 45 further comprising the step of governing the volume of services being processed by the service processing means, the number of subscribers to a particular service, or the number of output devices to which a service may be broadcast.

62. A medium having processor readable program code embodied therein for automatically forwarding personalized output from scheduled services processed by an on-line analytical processing system, the processor readable code comprising:

code for causing a processor to process at least one scheduled service in an on-line analytical processing system and generating a separate personalized output report for each subscriber to the service based on subscriber-specific personalization information stored for that subscriber from the base service output generated from the on-line analytical processing system; and code for causing a processor to automatically forward personalized output from the services to one or more subscriber output devices specified for that service.

* * * * *

UNITED STATES PATENT AND TRADEMARK OFFICE
Certificate

Patent No. 6,269,393 B1                                                                                           Patented: July 31, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Michael Saylor, Vienna, VA; Kyle N. Yost, Arlington, VA; Peter G. Wilding, Denver, CO; and Robert G. Trenkamp, Annapolis, MD.

Signed and Sealed this First Day of March 2005.

JASON D. CARDONE
*Supervisory Patent Examiner*
Art Unit 2152